(12) United States Patent
King

(10) Patent No.: US 8,344,666 B1
(45) Date of Patent: Jan. 1, 2013

(54) CIRCUIT FOR AND METHOD OF IMPLEMENTING A CONFIGURABLE LIGHT TIMER

(76) Inventor: John Joseph King, Wheaton, IL (US)

( * ) Notice: Subject to any disclaimer, the term of this patent is extended or adjusted under 35 U.S.C. 154(b) by 350 days.

(21) Appl. No.: 12/847,037

(22) Filed: Jul. 30, 2010

(51) Int. Cl.
*H05B 39/04* (2006.01)
(52) U.S. Cl. .................. 315/360; 315/291; 315/297
(58) Field of Classification Search .................. 315/360, 315/362, 297, 291–293
See application file for complete search history.

(56) References Cited

U.S. PATENT DOCUMENTS

| | | | |
|---|---|---|---|
| 4,349,748 A | | 9/1982 | Goldstein et al. |
| 4,521,843 A | | 6/1985 | Pezzolo et al. |
| 5,046,157 A | | 9/1991 | Smith et al. |
| 5,160,853 A | | 11/1992 | Simon et al. |
| 5,191,265 A | * | 3/1993 | D'Aleo et al. ............ 315/295 |
| 5,442,177 A | | 8/1995 | Boulos et al. |
| 5,949,200 A | | 9/1999 | Ference et al. |
| 5,962,989 A | | 10/1999 | Baker |
| 5,990,471 A | | 11/1999 | Watanabe |
| 6,120,165 A | | 9/2000 | Shalvi |
| 6,121,889 A | | 9/2000 | Janda et al. |
| 6,169,377 B1 | * | 1/2001 | Bryde et al. ............ 315/294 |
| 6,658,303 B2 | * | 12/2003 | Hatemata et al. ............ 700/14 |
| 6,958,584 B2 | | 10/2005 | Nakamura et al. |
| 6,965,801 B2 | * | 11/2005 | Hall ............ 700/66 |
| 7,255,596 B2 | | 8/2007 | Pyrros |
| 7,382,100 B2 | | 6/2008 | Johnson et al. |
| 7,575,470 B2 | | 8/2009 | Pyrros |
| 7,579,717 B2 | | 8/2009 | Blair et al. |
| 7,628,643 B2 | | 12/2009 | Pyrros |
| 7,689,875 B2 | | 3/2010 | Cahill et al. |
| 7,694,005 B2 | | 4/2010 | Reckamp et al. |
| 7,859,136 B2 | | 12/2010 | Blair et al. |
| 8,084,700 B1 | | 12/2011 | Massaro et al. |
| 2004/0260853 A1 | | 12/2004 | Cho |
| 2006/0125324 A1 | | 6/2006 | Lai Lui |
| 2006/0239123 A1 | | 10/2006 | Chen |
| 2006/0250745 A1 | | 11/2006 | Butler et al. |
| 2007/0183270 A1 | | 8/2007 | Sakamoto et al. |
| 2008/0229125 A1 | | 9/2008 | Lin et al. |
| 2009/0190443 A1 | | 7/2009 | Huizi et al. |
| 2009/0225811 A1 | | 9/2009 | Albert et al. |
| 2009/0273243 A1 | | 11/2009 | Blair et al. |
| 2010/0025210 A1 | | 2/2010 | Simard et al. |
| 2010/0052487 A1 | | 3/2010 | Stein |
| 2011/0018448 A1 | | 1/2011 | Metchear, III et al. |

OTHER PUBLICATIONS

Schlage LiNK RP200 Light Module, Rev. Mar. 2009, (2 pages).
Intermatic Model EI600 Self-Adjsuting Wall Switch Timer, Installation and User Instructions, (2 pages).
Heath/Zenith Motion Sensor Light Control Model SL-5408, 2004.
Honeywell RPLS540A/RPLS541A User Guide, 7-day Solar Programmable Wall Switch, May 17, 2010.

(Continued)

*Primary Examiner* — James H Cho

(57) ABSTRACT

A circuit for implementing a configurable light timer controlling a light is disclosed. The circuit comprises an input portion for receiving timing characterization data, the input portion having a slot adapted to receive a portable memory device storing the timing characterization data; a control circuit coupled to access a set of data of a plurality of sets of data of the timing characterization data; and a multiple setting selection actuator coupled to the control circuit, the multiple setting selection actuator enabling a selection of the set of data to be implemented by the control circuit. A method of implementing a configurable light timer is also disclosed.

18 Claims, 15 Drawing Sheets

OTHER PUBLICATIONS

Leviton Indoor Plug-In Timer, PK-93694-10-00-2A, 2010.
Tork Digital Time Switch Instruction Manual, DZM200 BP, Mar. 20, 2007.
Tork Digital Lighting Controller Instruction Manual, DLC400BP, Jun. 1, 2007.
Aube Technologies T1033 Installation and User Guide Programmable Wall Switch, Nov. 30, 2006.
3COM IEEE 802.11 Wireless LANs, Jan. 2000, 14 pages.
Intermatic Model ST01 Series Self-Adjusting Wall Switch Timer, Installation and User Instruction, 2 pages.
GE 7-Day Digital Timer User Instructions, 1 page.
GE Smart Digital Timer, Manual Version 2, Nov. 24, 2009, 1 page.
GE Digital Time Switch, Nov. 24, 2009, 2 pages.
Smartlink—INSTEON Central Controlle—Smarthome, 5 pages.

* cited by examiner

Timing Characterization

Standard Time

| Day | On | | Off | |
|-----|-----|-----|-----|-----|
| MON | 08:00 | ○ AM / ● PM | 05:00 | ● AM / ○ PM |
| TUE | 08:00 | ○ AM / ● PM | 05:00 | ● AM / ○ PM |
| WED | 08:00 | ○ AM / ● PM | 05:00 | ● AM / ○ PM |
| THU | 08:00 | ○ AM / ● PM | 05:00 | ● AM / ○ PM |
| FRI | 08:00 | ○ AM / ● PM | 05:00 | ● AM / ○ PM |
| SAT | 09:00 | ○ AM / ● PM | 05:00 | ● AM / ○ PM |
| SUN | 09:00 | ○ AM / ● PM | 05:00 | ● AM / ○ PM |

Daylight Savings Time

| Day | On | | Off | |
|-----|-----|-----|-----|-----|
| MON | 05:00 | ○ AM / ● PM | 06:00 | ● AM / ○ PM |
| TUE | 05:00 | ○ AM / ● PM | 06:00 | ● AM / ○ PM |
| WED | 05:00 | ○ AM / ● PM | 06:00 | ● AM / ○ PM |
| THU | 05:00 | ○ AM / ● PM | 06:00 | ● AM / ○ PM |
| FRI | 05:00 | ○ AM / ● PM | 06:00 | ● AM / ○ PM |
| SAT | 05:00 | ○ AM / ● PM | 06:00 | ● AM / ○ PM |
| SUN | 05:00 | ○ AM / ● PM | 06:00 | ● AM / ○ PM |

[ Back ]    [ Next ]

FIG. 21

Timing Characterization

A Characterization

| Day | On | | Off | |
|---|---|---|---|---|
| MON | 05:00 | ○ AM ● PM | 06:00 | ● AM ○ PM |
| TUE | 05:00 | ○ AM ● PM | 06:00 | ● AM ○ PM |
| WED | 05:00 | ○ AM ● PM | 06:00 | ● AM ○ PM |
| THU | 05:00 | ○ AM ● PM | 06:00 | ● AM ○ PM |
| FRI | 05:00 | ○ AM ● PM | 06:00 | ● AM ○ PM |
| SAT | 05:00 | ○ AM ● PM | 06:00 | ● AM ○ PM |
| SUN | 05:00 | ○ AM ● PM | 06:00 | ● AM ○ PM |

B Characterization

| Day | On | | Off | |
|---|---|---|---|---|
| MON | 08:00 | ○ AM ● PM | 05:00 | ● AM ○ PM |
| TUE | 08:00 | ○ AM ● PM | 05:00 | ● AM ○ PM |
| WED | 08:00 | ○ AM ● PM | 05:00 | ● AM ○ PM |
| THU | 08:00 | ○ AM ● PM | 05:00 | ● AM ○ PM |
| FRI | 08:00 | ○ AM ● PM | 05:00 | ● AM ○ PM |
| SAT | 09:00 | ○ AM ● PM | 05:00 | ● AM ○ PM |
| SUN | 09:00 | ○ AM ● PM | 05:00 | ● AM ○ PM |

[Back] [Next]

FIG. 22-A

Timing Characterization

C-Characterization

| Day | On | | Off | |
|---|---|---|---|---|
| MON | 05:00 | ○ AM ● PM | 08:00 | ● AM ○ PM |
| TUE | 05:00 | ○ AM ● PM | 08:00 | ● AM ○ PM |
| WED | 05:00 | ○ AM ● PM | 08:00 | ● AM ○ PM |
| THU | 05:00 | ○ AM ● PM | 08:00 | ● AM ○ PM |
| FRI | 05:00 | ○ AM ● PM | 08:00 | ● AM ○ PM |
| SAT | 05:00 | ○ AM ● PM | 09:00 | ● AM ○ PM |
| SUN | 05:00 | ○ AM ● PM | 09:00 | ● AM ○ PM |

D-Characterization

| Day | On | | Off | |
|---|---|---|---|---|
| MON | 03:00 | ○ AM ● PM | 10:00 | ● AM ○ PM |
| TUE | 03:00 | ○ AM ● PM | 10:00 | ● AM ○ PM |
| WED | 03:00 | ○ AM ● PM | 10:00 | ● AM ○ PM |
| THU | 03:00 | ○ AM ● PM | 10:00 | ● AM ○ PM |
| FRI | 03:00 | ○ AM ● PM | 10:00 | ● AM ○ PM |
| SAT | 03:00 | ○ AM ● PM | 10:00 | ● AM ○ PM |
| SUN | 03:00 | ○ AM ● PM | 10:00 | ● AM ○ PM |

Back | Next

FIG. 22-B

CIRCUIT FOR AND METHOD OF IMPLEMENTING A CONFIGURABLE LIGHT TIMER

FIELD OF THE INVENTION

The present invention relates generally to light timers, and in particular, to a circuit for and method of implementing a configurable light timer.

BACKGROUND OF THE INVENTION

Conventional timers for lights, such as timers for indoor lamps or outdoor lights for example, either provide little functionality, or are difficult to program. Because of the limited size of the conventional timers, the size of the screen and the size of the interface for programming the timer are both relatively small. This is particularly true of an in-wall timer, which must fit in an electrical box, commonly called a junction box. Not only does a user of the in-wall timer have to read a very small display, but the user has to advance through a menu shown on the small display using a very limited interface which is provided on the remaining portion of the timer. Entering data on such a user interface is particularly difficult because the in-wall timer is fixed and generally positioned well below eye level.

Further, conventional timers are often unreliable. For example, conventional mechanical timers often malfunction over time, leaving the user without the use of the timer for some period of time and requiring the user to incur the expense of replacing the timer. Moreover, advanced electronic timers may be sufficiently complicated to operate, providing a barrier to certain groups of people who would otherwise use a timer, but don't want to struggle through a complex interface on the small screen of the timer to properly set the timer. These groups of users are either left with no timing operation for their lights, or timers which do not provide the timing operation that they desire. Without an effective timer for a light for example, the light may be on significantly longer than necessary, not only wasting energy but in many cases increasing pollution as a result. As energy consumption world-wide continues to increase, it is important to reduce or minimize the consumption of energy in any way possible. The timer of the present invention provides significant benefits in reducing energy consumption.

SUMMARY OF THE INVENTION

A circuit for implementing a configurable light timer controlling a light is disclosed. The circuit comprises an input portion for receiving timing characterization data, the input portion having a slot adapted to receive a portable memory device storing the timing characterization data; a control circuit coupled to access a set of data of a plurality of sets of data of the timing characterization data; and a multiple setting selection actuator coupled to the control circuit, the multiple setting selection actuator enabling a selection of the set of data to be implemented by the control circuit.

According to an alternate embodiment, a circuit for implementing a configurable light timer controlling a light, the circuit comprises an input portion for receiving timing characterization data having daylight savings time data and standard time data; a control circuit for accessing a set of data of the timing characterization data; and a daylight savings time actuator coupled to the control circuit, the daylight savings time actuator enabling the selection of a set of daylight savings time data to be accessed by the control circuit.

A method of implementing a configurable light timer controlling a light is also disclosed. The method comprises receiving timing characterization data having a plurality of sets of data; receiving an input from a multiple setting selection actuator on the configurable light timer; selecting a set of data in response to the input from the multiple setting selection actuator; and implementing, by the configurable light timer, the set of data.

BRIEF DESCRIPTION OF THE DRAWINGS

FIG. 21 is a program screen enabling the entry of timing characterization data by a computer for a daylight savings feature when implementing a light timer according to an embodiment of the present invention;

FIG. 22 is a program screen enabling the entry of multiple sets of timing characterization data when implementing a light timer according to an embodiment of the present invention;

FIG. 27 is a flow chart showing a method of implementing a timer using a wireless transceiver according to an embodiment of the present invention.

DETAILED DESCRIPTION OF THE DRAWINGS

Figure 1:
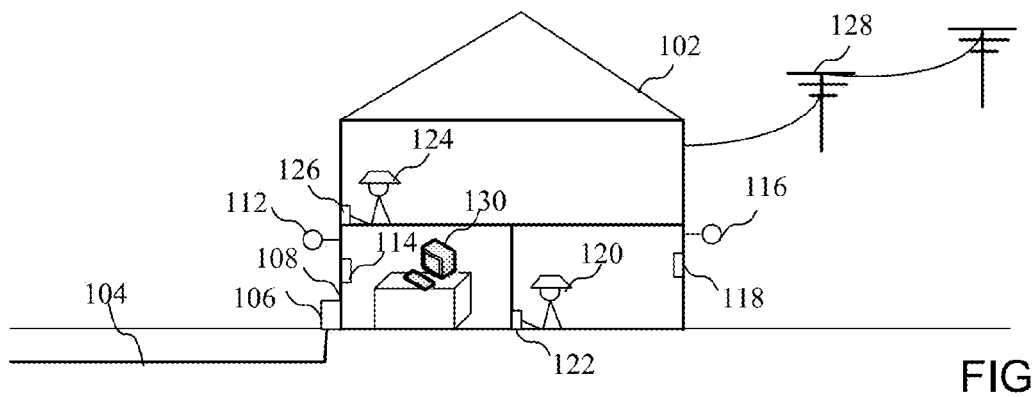
FIG. 1 is a block diagram of a system for implementing a plurality of light timers according to an embodiment of the present invention.

Turning first to FIG. 1, a block diagram of a system for implementing a plurality of light timers is shown. The system of FIG. 1 comprises a building 102 receiving a source of power from a power line 104 coupled to an electric box 106 for supplying electrical current to the building 102. The building 102 may comprise various light elements at various locations, both internal and external as well as upstairs and downstairs, and which are powered by electrical wiring 108 represented by the framing of the building as shown. On the lower level, an outdoor light 112 which is fixed to a wall is controlled by a switch 114 in the front of the building, while a second outdoor light 116 in the back of the building is controlled by a switch 118. The lower level includes a portable light 120 which is plugged into an outlet 122, and an upper level also has a portable light 124 which is plugged into an outlet 126. The building is also coupled to a communication network 128, such as a telephone or cable network, for downloading data, such as computer programs. A computer 130 is adapted to receive a computer program stored on an electronic media such as a portable memory device, or may receive the computer program from the communication network. While the arrangement of lights, outlets, and switches are shown by way of example in FIG. 1 for purposes of explanation, it should be understood that other arrangements of and additional lights, outlets and switches could be employed. As will be described in more detail below, the timers of the present invention could be implemented as any of the switches or with any of the outlets/portable lights of the building. As will become apparent, the circuits and methods of the present invention provide a simplified way of configuring a timer by downloading timing characterization data from a portable memory device and optionally receiving other, simpler timing characterization inputs from actuators on the timer.

Figure 2:
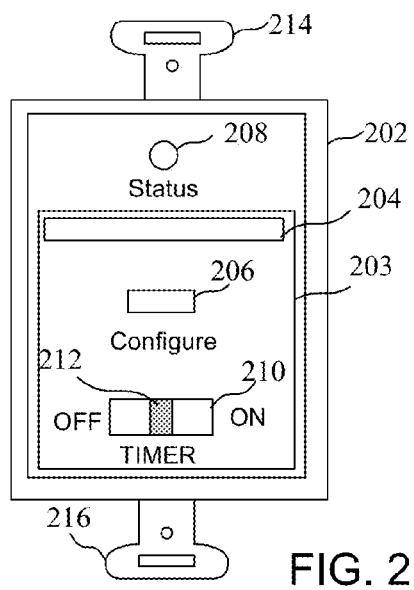
FIG. 2 is a perspective view of a front panel of an in-wall light timer according to a embodiment of the present invention.

Turning now to FIG. 2, a perspective view of a front panel of an in-wall configurable light timer is shown. As shown in FIG. 2, a timer 202 comprises an input portion 203 having a slot 204 for receiving a portable memory device. An optional configuration actuator 206 enables a user of the in-wall light timer to cause data to be downloaded to a memory of the device. However, as will be described in more detail below, the light timer could detect when a portable memory device is inserted into the slot 204 and automatically download data from the portable memory device to a memory device of the in-wall timer. As can be seen, the slot 204 is easily accessible on the front of the in-wall timer. Information related to storing timing characterization data on the portable memory device and an optional internal memory of the timer will be provided in more detail below. A feedback portion, comprising a status indicator light 208 according to the embodiment of FIG. 2, enables a user to determine a status of the in-wall timer. The status indicator light could be a multicolor light emitting diode (LED) for example.

By way of example, a red light provided by the status indicator 208 could indicate that the timer does not have data or that it is not operating properly, an orange light provided by the status indicator could indicate that the in-wall timer is receiving timing characterization data from a portable memory device inserted in slot 204, and a green light could indicate that timing characterization data has been successfully downloaded and the portable memory device may be removed. Alternatively, according to an embodiment described in more detail in reference to FIG. 10, the portable memory device would remain in the in-wall timer and function to provide timing characterization data necessary for the in-wall timer to operate. According to a further embodiment, the status indicator 308 may flash red when the timer is not functioning properly, allowing the status light to show red when the lights attached to the timer are turned off, and green when the lights are turned on. Such an implementation of the actuator would enable the status indicator to not only provide immediate feedback to a user (i.e. enable the user to see the status of the light attached to the timer without going to the light to see the status in the case of an outdoor light), but also enable a user to see if the timer is not providing the correct or a desired setting for the light. For example, a user may notice that the status indicator is red at a time when the user believes that the light should be on or when a user would like the light to be on. The user can then reload the timing characterization data to ensure that the data is correct and includes the data that the user desires. Such user feedback can lead to a significant reduction in energy in cases where lights are on longer than necessary.

An optional on/off actuator 210 may also be implemented to enable a user to manually override the timing characterization data and turn on or off a light attached to the in-wall timer. The on/off actuator 210 comprises a movable switch 212 which may between an "off" position, a "timer" position, and an "on" position. When the moveable switch 212 is in the timer position, the timer would operate according to timing characterization data stored on or downloaded from a portable memory device and received by way of input actuators on the timer. When the moveable switch 212 is moved to the "off" position, the timer will cause a light attached to the timer to remain off. Conversely, when the moveable switch 212 is moved to the "on" position, the timer will cause a light attached to the timer to remain on. The movable switch 212 preferably may be pressed inward when in the "timer" position to override the current setting until the next switching of the light attached to the timer. For example, if a light is set in the on state, the light will be turned off when the moveable switch 212 is pressed and will remain off until the timer is set to turn the light on again. Alternatively, if a light is currently set in the off state, the light will be turned on when the moveable switch 212 is pressed and will remain on until the timer is set to turn the light off again. While the moveable switch 212 provides on example of an actuator for manually controlling a light attached to the timer, it should be understood that other actuators could be employed according to the invention.

Brackets 214 and 216 enable the attachment of the timer to an electrical box coupled to a stud of a wall, for example, as will be described in more detail below in reference to FIG. 16. Finally, a cover, such as a hinged cover may cover the input portion 203. While the embodiment of FIG. 2 has an optional status indicator light 208, the embodiment of FIG. 2 has no display, providing a significant cost reduction compared to conventional timers. As can be seen, the slot 204 is on a front surface of the timer having brackets 214 and 216, making it simple to insert and remove a portable memory device in a timer which is mounted flush with a wall. According to the embodiment of FIG. 2, a displayless, actuatorless timer is provided.

Figure 3:
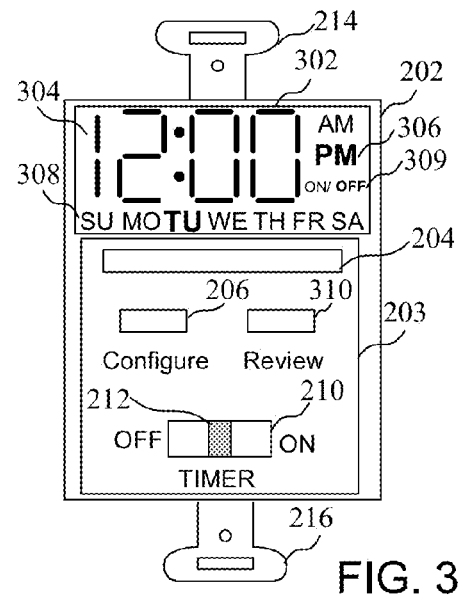
FIG. 3 is a perspective view of a front panel of an in-wall light timer according to a second embodiment of the present invention.

Turning now to FIG. 3, a perspective view of a front panel of an in-wall light timer according to a second embodiment of the present invention is shown. According to the embodiment of FIG. 3, a display 302 provides additional feedback and data and enables a user to see one or more current settings of the timer and to determine whether the timer is operating properly. More particularly, the display 302 comprises a clock portion 304 which may be set to display "12-hour time" where a separate AM-PM portion 306 would indicate whether the current time was AM or PM (shown here as PM). The display would also preferably include a day-of-the-week portion 308, where the current day of the week is shown here to be Tuesday. The embodiment of FIG. 3 also preferably includes an on/off indicator 309 which will show either "on" or "off" highlighted to indicate a current setting of the timer.

A review indicator 310 may be implemented to enable an evaluation of the timing characterization data. The review actuator may then be pressed, for example, to determine the timing characteristics of the timer. That is, when the review actuator is pressed, the entire timing characterization will be shown on the display. For example, the day starting with Sunday would be indicated on the display with the on and off times being indicated in sequence with a corresponding time for each on an off setting by the on/off indicator 308. According to alternate embodiments, the depressing the review actuator will cause the timing characterization of the current day to be displayed, where depressing of the review actuator again would cause the timing characterization data for the following day to be displayed. According to the alternate embodiment, depressing and holding the review actuator for a predetermined period of time would cause the entire timing characterization data from Sunday to Saturday to be displayed.

Figure 4:
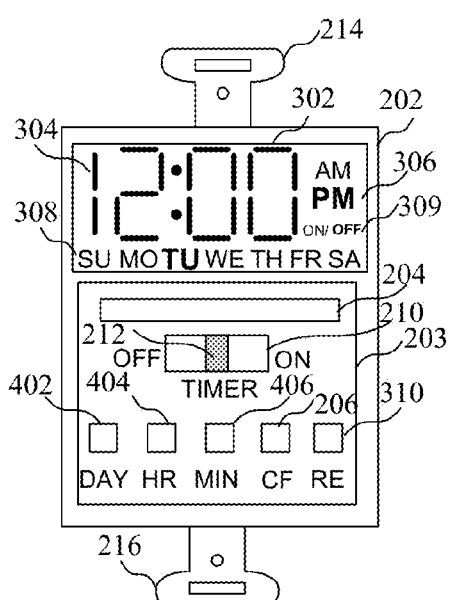
FIG. 4 is a perspective view of a front panel of an in-wall light timer according to a third embodiment of the present invention.

Turning now to FIG. 4, a perspective view of a front panel of an in-wall light timer according to a third embodiment of the present invention is shown. According to the embodiment of FIG. 4, the input portion 203 comprises an actuator portion enabling a user to set the current day and time on the timer. That is, a day actuator 402 enables the selection of the current day which is displayed on the display 302 and used by the timer in implementing an on/off function of the timer. A hour actuator 404 and minute actuator 406 are also provided for enabling a user to set, from the timer, the current time to be displayed on the display and used by the timer. Each depression of an actuator 402, 404 or 406 will enable advancing data in the display to advance to the next value. The configuration (CF) actuator 206 and review (RE) actuator 310 are also provided according to the embodiment of FIG. 4. As will be described in more detail below, the data entered by way of the actuators 402-406 will be stored on a memory device used by the timer, such as a portable memory device or internal memory device of the timer.

Figure 5:
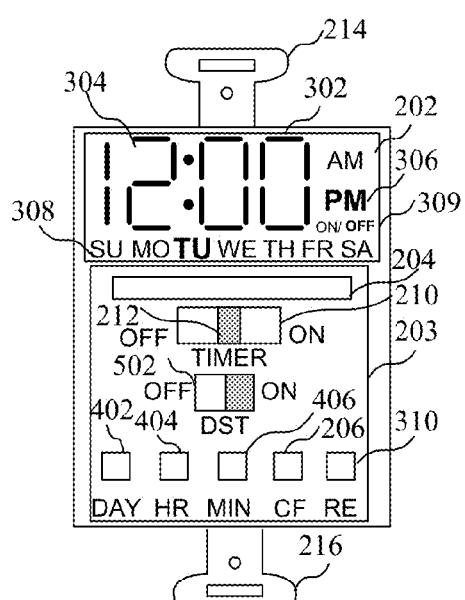
FIG. 5 is a perspective view of a front panel of an in-wall light timer according to a fourth embodiment of the present invention.
Figure 6:
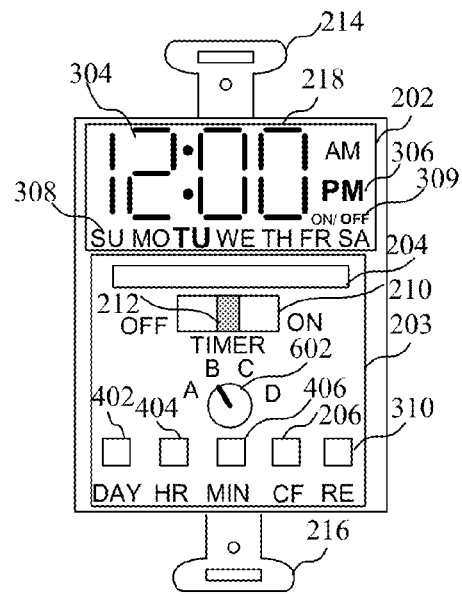
FIG. 6 is a perspective view of a front panel of an in-wall light timer according to a fifth embodiment of the present invention.

Turning now to FIGS. 5 and 6, embodiments having multiple setting selection actuators are shown. In particular, a perspective view of a front panel of an in-wall light timer according to the embodiment of FIG. 5 shows a daylight savings time (DST) actuator 502 which will enable the selection of a daylight savings function. According to one embodiment, the DST actuator will be used to manually select timing characterization data to be implemented during daylight savings time. According to another embodiment, the setting of the DST actuator to "on" will change the clock to the correct DST time when the date changes to daylight savings time based upon calendar data stored in the memory and a current date. According to that embodiment, the timer will also automatically operate according to timing characterization data to be implemented during daylight savings time when the current date is during daylight savings time.

Turning now to FIG. 6, a perspective view of a front panel of an in-wall light timer according to a fifth embodiment the present invention is shown. According to the embodiment of FIG. 6, a multiple setting selection actuator 602 may be implemented to allow the user to select between one of multiple settings. While four settings designated A-D are shown here, it should be understood that a greater number or a fewer number of settings could be employed. As will be described in more detail below, the DST actuator 502 could also be employed in conjunction with the multiple setting selection actuator 602, where each setting A-D would also have a separate set of timing characterization data for each of the daylight savings time and standard time. On benefit of the multiple setting selection actuators, such as the DST actuator 502 or the multiple setting selection actuator 602 is that they enable a user to change the setting without entering a menu on the display. That is, the DST actuator 502 or the multiple setting selection actuator 602 comprises dedicated actuators, where a signal indicating that a particular set of timing characterization data is desired is generated in response to the selection by the DST actuator 502 or the multiple setting selection actuator 602.

Figure 7:
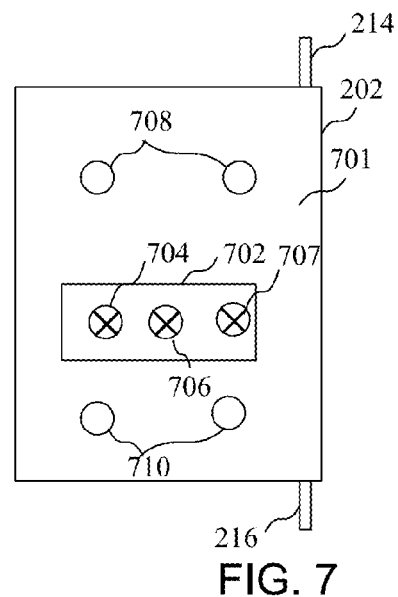
FIG. 7 is a perspective view of a first side of the embodiments of FIGS. 2-6 according to an embodiment of the present invention.

Turning now to FIG. 7, a perspective view of a first side of the embodiments of FIGS. 2-6 according to an embodiment of the present invention is shown. In particular, a first side of the timer comprises a recessed portion 702 of the housing of timer 202 having electrical contacts 704, 706 and 707 for receiving wires of the electrical wiring 108 of the building 102 by way of screws, for example. As will be described in more detail below in reference to FIGS. 10-12, the timer will function as a switch for applying power or disabling power from a source of power to a light provided by way of the contacts 704 or 706 according to timing characterization data for the timer. According to one embodiment, contact 704 which is to be coupled to a source of a reference input voltage and the contact 706 comprises an output terminal is adapted to be coupled to the positive terminal of the light. Accordingly, an output terminal, which is coupled to either a positive terminal or a negative terminal of the light, is disconnected from a reference voltage, such as a reference input voltage or a ground voltage, to turn the light off. However, other arrangements including additional contacts such as a grounding contact 707 could be employed. Upper attachment elements 708 and lower attachment elements 710 enable the attachment of the timer to an electrical box. As will be described in more detail below, the upper attachment elements 708 and lower attachment elements 710 may comprise projections which are received in corresponding tracks of the electrical box or an adapter placed in the electrical box, for example.

Figure 8:
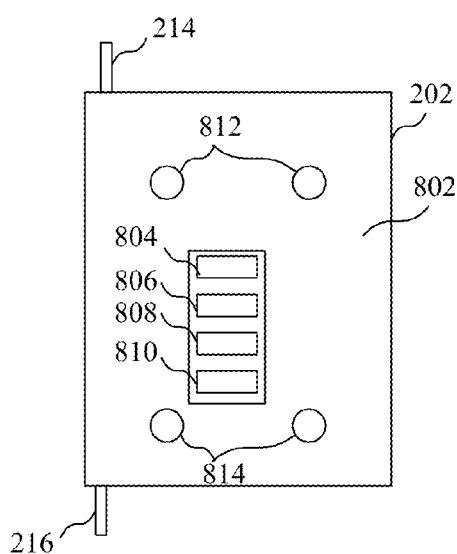
FIG. 8 is a perspective view of second side of an embodiment enabling a wireless transceiver according to an embodiment of the present invention.

Turning now to FIG. 8, a perspective view of a second side of an embodiment enabling a wireless transceiver according to an embodiment of the present invention is shown. A second side 802 of the timer, preferably opposite the first side 701, comprises contact elements 804-810. As will be described in more detail below, the contact elements, shown here as contact pads, are adapted to be coupled to corresponding contacts of a wireless communication module which may be used for downloading timing characterization data to the timer. The side 802 of the timer also comprises upper attachment elements 812 and lower attachment elements 814 which are received by corresponding tracks of the electrical box or an adapter placed in the electrical box.

Figure 9:
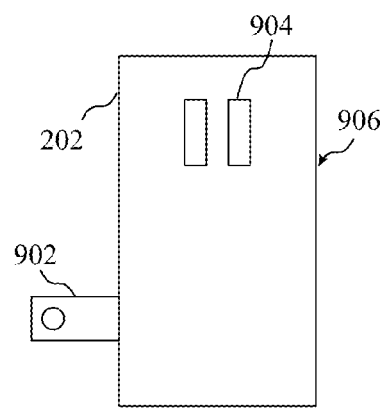
FIG. 9 is a side view of a timer having a front panel according to FIGS. 1-6 and adapted to be implemented with a wall outlet according to an embodiment of the present invention.

Turning now to FIG. 9, a side view shows a timer having a front panel according to FIGS. 1-6 and adapted to be implemented with a wall outlet according to an embodiment of the present invention. The side view of FIG. 9 shows standard prongs 902 which are adapted to be inserted into an electrical outlet and a receiving portion 904 for receiving the prongs of a plug of a portable light, for example. While the embodiments of FIGS. 2-8 relate to an in-wall timer, the features, interfaces and operation of the in-wall timer described in FIGS. 2-6 would equally apply to an outlet timer as described in FIG. 9 (according to a display portion and input portion 203 on front surface 906).

Figure 10:
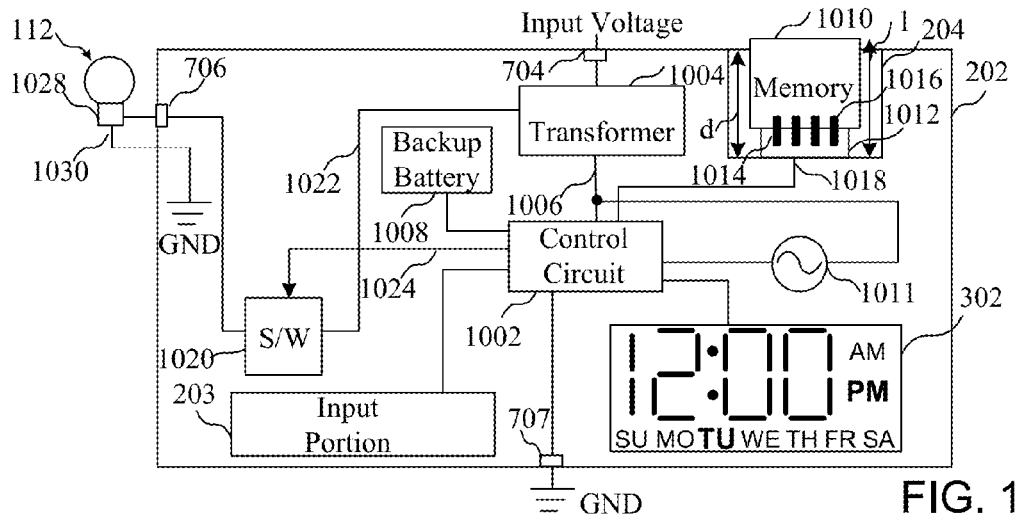
FIG. 10 is a block diagram of the a circuit enabling the operation of the embodiments of FIGS. 1-7 and 9 according to a first embodiment of the present invention.

Turning now to FIG. 10, a block diagram of a circuit enabling the operation of the embodiments of FIGS. 1-7 and 9 according to a first embodiment of the present invention is shown. According to the embodiment of FIG. 10, a control circuit 1002 is coupled to a transformer 1004 which receives a source of power such as a reference input voltage (e.g. a voltage applied to the building and received by the timer by way of the contact 704). The control circuit 1002 may be a processor, such as a microprocessor for example. The input voltage may be coupled to the transformer 1004 which generates a reference voltage on an internal voltage line 1006. The voltage generated on the internal voltage line 1006 may comprise a low voltage (e.g. 5 volts for powering circuit elements of the timer 202) which may be coupled to the other elements by the control circuit 1002. A backup battery 1008 is also coupled to the control circuit, and may be charged by the voltage applied to the control circuit and used by the control circuit to power other elements of the timer 202 in the event of a loss of power. The control circuit is also coupled to the input portion 203 to receive inputs entered by a user, as well as the display 302 to display the status of the timer as set forth above. The control circuit is also coupled to an oscillator 1011 which enables the control circuit to maintain the time for the timer after a current time is supplied to the timer.

Also shown in FIG. 10 is the slot 204 for receiving a portable memory device 1010. The slot comprises a connector 1012 having contact elements 1014 for mating with corresponding contact elements 1016 of the portable memory device 1010. The slot 204 may have a depth (d) which is just slightly less than the length (l) of the portable memory device so that the portable memory device extends slightly outside of the timer. The slot may also comprise a spring loaded slot enabling a user to depress the portable memory device, resulting in the portable memory device extending further outside the slot so that it can easily be removed from the slot. The control circuit 1002 accesses the portable memory device by way of a communication link 1018, which may be a bidirectional data bus. The portable memory device could be any type of non-volatile memory device. By way of example, the portable memory device could be, but not limited to, a secure digital (SD) card, a Sony brand "memory stick", or portable USB memory device. According to one embodiment, the connector 1012 could be a connector for receiving a portable universal serial bus (USB) memory device. The slot may be configured to receive the portable memory device, where the portable memory device may reside within the slot during normal operation, or have a connector substantially at the surface of the timer, where the portable memory device is generally coupled to the connector of the slot during configuration or when otherwise necessary and then removed.

The timer also comprises a switch 1020 which enables the application of a voltage provided by a voltage line 1022 from the transformer 1004 to a light, such as light 112. The voltage on voltage line 1022 is the appropriate voltage for providing power at the light, which may be the input voltage or a voltage which is greater than or less than the input voltage. The switch is controlled by a control signal 1024. When the switch is closed, the voltage at the voltage line 1022 is provided to a positive electrical terminal of the light, while a negative electrical terminal of the light is coupled to second reference voltage designated as a ground (GND) voltage. According to an alternate embodiment, the switch could be between a negative terminal of the light and a ground node to connect or disconnect the ground potential. In either case, the switch functions to decouple a reference voltage from the device which is being controlled by the timer, therefore disabling the device. As will be described in more detail below, the control signal 1024 coupled to control the switch 1020 is generated by the control circuit 1002 according to timing characterization data stored in the portable memory device 1010. The control circuit 1002 will also enable the current time and date to be displayed, as well as enable other functions such as the review function to review the timing characterization data in response to the selection of the review actuator 310 of the input portion 203. During normal operation, the control circuit enables the timer to run continuously, and more particularly, in a repeating pattern, either daily or weekly for example, according to the timing characterization data.

Figure 11:
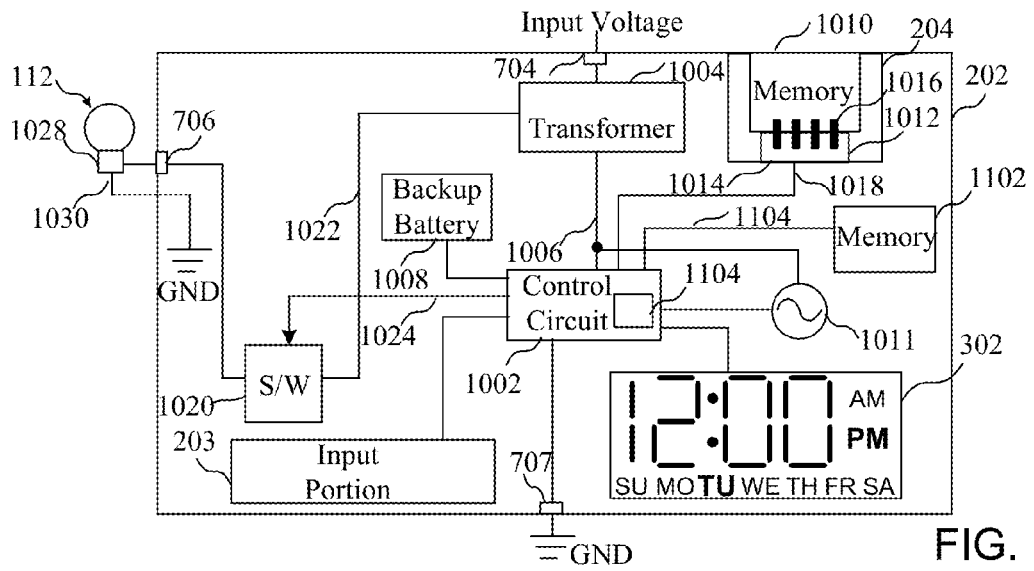
FIG. 11 is a block diagram of the a circuit enabling the operation of the embodiments of FIGS. 1-7 and 9 according to a second embodiment of the present invention.

Turning now to FIG. 11, a block diagram of a circuit enabling the operation of the embodiments of FIGS. 1-7 and 9 according to a second embodiment the present invention is shown. As described above in reference to FIGS. 2-6, data on the portable memory device may be loaded into a memory 1102 by the control circuit 1002. The memory 1102 may be a fixed, internal memory, for example. Alternatively, the data on the portable memory device may be stored in a memory cache 1104 of the processor, thereby reducing the cost of the timer. According to the embodiment of FIG. 11, the portable memory device 1010 may be removed and used to configure another timer in the building. Rather than accessing the timing characterization data from the portable memory device, the control circuit would access the timing characterization data from the memory 1102 or a cache memory 1104 of the processor after the timing characterization data is downloaded and the portable memory device is removed. For example, the control circuit 1002 would provide the necessary read and write access signals to read and write data from to the memory 1102 by way of a data access bus 1104. That is, the control circuit would access the data from the portable memory device 1010 by way of the communication link 1018, which may comprise a data access bus enabling reading from the memory and provide that data to the memory 1102 by way of the data access bus 1104 for later access.

Figure 12:
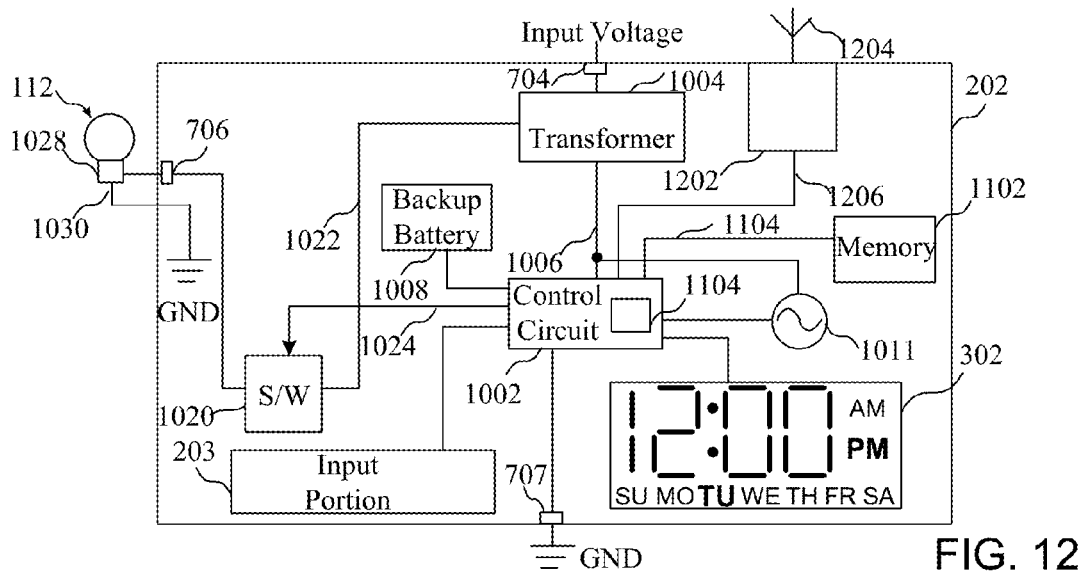
FIG. 12 is a block diagram of the a circuit enabling the operation of the embodiment of FIG. 8 according to an embodiment of the present invention.

Turning now to FIG. 12, a block diagram of a circuit enabling the operation of the embodiment of FIG. 8 is shown. According to the embodiment of FIG. 12, rather than receiving data by way of the portable memory device, a wireless data transceiver 1202 having an antenna 1204 is coupled to the control circuit 1002 by way of a communication link 1206. The communication link 1206 may comprise a bi-directional serial bus, for example. An example of a wireless data transceiver is provided in more detail in reference to FIG. 13.

Figure 13:
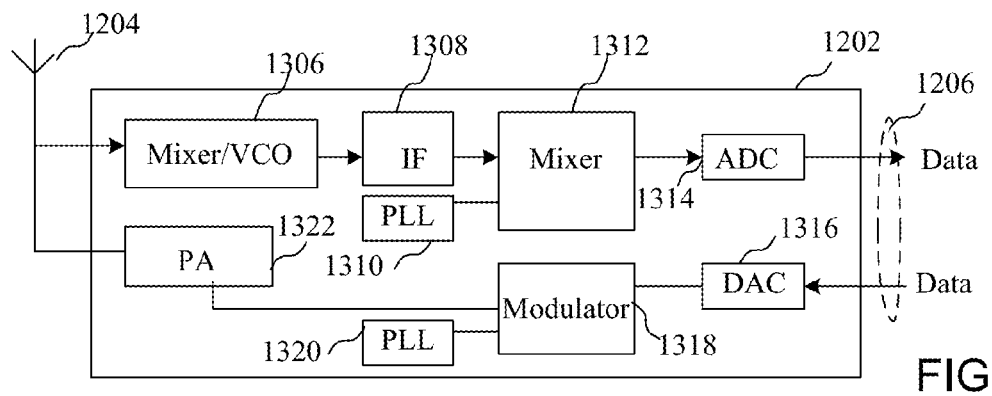
FIG. 13 is a block diagram of the data transceiver 1202 of FIG. 12 according to an embodiment of the present invention.

Turning now to FIG. 13, a block diagram of the data transceiver 1202 of FIG. 12 is shown. In particular, the antenna 1204 receives wireless communication signals according to a predetermined wireless communication protocol. The data may be sent to the data transceiver 1202 by way of a computer, such a computer 130, having or in communication with a corresponding data transceiver 1202. The received data is coupled to a combined mixer/voltage controlled oscillator 1306, the output of which is coupled to an intermediate frequency (IF) circuit 1308. Based upon outputs of the IF circuit and a phase locked loop (PLL) 1310, a mixer 1312 generates the received data. An analog-to-digital converter (ADC) 1314 then generates digital data representing the timing characterization data.

The control circuit may also provide data to the data transceiver for transmission to the computer 130. Data to be transmitted from the data transceiver 1202 is coupled to a digital-to-analog converter (DAC) 1316, the output of which is coupled to a modulator 1318 which is also coupled to a PLL 1320. A power amplifier receives the output of the modulator to drive the antenna 1204 and transmit the data. According to one embodiment, the data transceiver could implement the IEEE Specification 802.11 wireless communication standard. While the circuit of FIG. 13 is provided by way of example, other wireless data transceivers could be employed according to the present invention.

Figure 14:
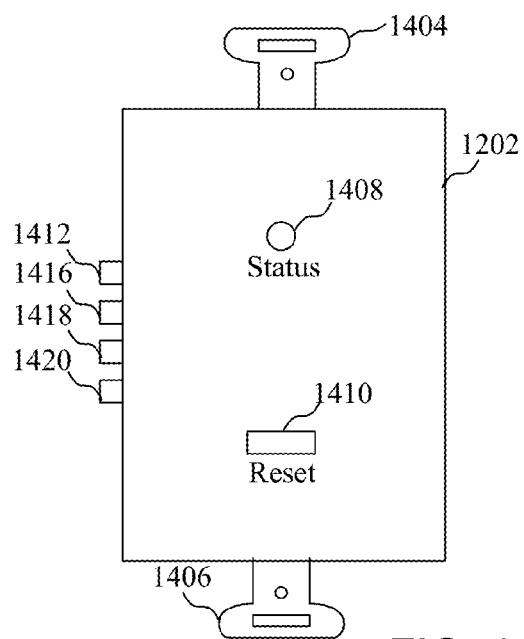
FIG. 14 is a perspective view showing the front of a module comprising the wireless transceiver according to an embodiment of the present invention.

Turning now to FIG. 14, a perspective view showing the front of a module comprising the wireless transceiver according to an embodiment of the present invention is shown. As shown in FIG. 14, a wireless data transceiver 1202 comprises brackets 1404 and 1406 which enable it to be attached to an electrical box. The wireless data transceiver also comprises a status indicator 1408 and a reset actuator 1410. By way of example, a green light may indicate that the transceiver is working properly, a flashing green light may indicate that the transceiver is sending or receiving data, and a red light may indicate that the transceiver is not functioning properly. The reset actuator may be selected to reset the transceiver, for example by requesting that the computer resend the timing characterization data. Unlike conventional timers which receive individual commands, such as individual on or off time commands comprising a real time command, the circuit of FIG. 14 enables the transfer of timing characterization data to a timer, where the timing characterization data is stored in a memory of the timer in real time. The timer operates using the timing characterization data rather than on and off commands provided by a wireless connection to the timer. Alternatively, only data which is changed from previous data may be downloaded.

Figure 15:
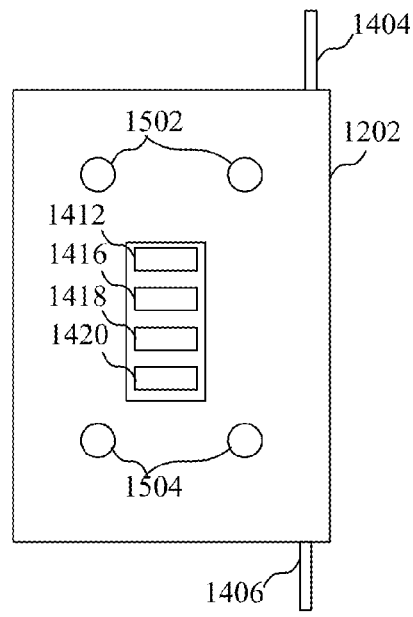
FIG. 15 is a side view of the module comprising the wireless transceiver of FIG. 14 according to an embodiment of the present invention.

The wireless data transceiver 1202 also comprises a plurality of contact elements, shown here as contact pins 1412-1420 which are adapted to mate with the contact elements 804-810 of the timer of FIG. 8. The contact elements may comprise a power contact, a ground contact, and two contacts of the bi-direction serial bus 1206. The side view of the wireless transceiver of FIG. 15 shows upper attachment elements 1502 and lower attachment elements 1504 which are received by corresponding tracks of the electrical box or an adapter placed in the electrical box.

Figure 16:
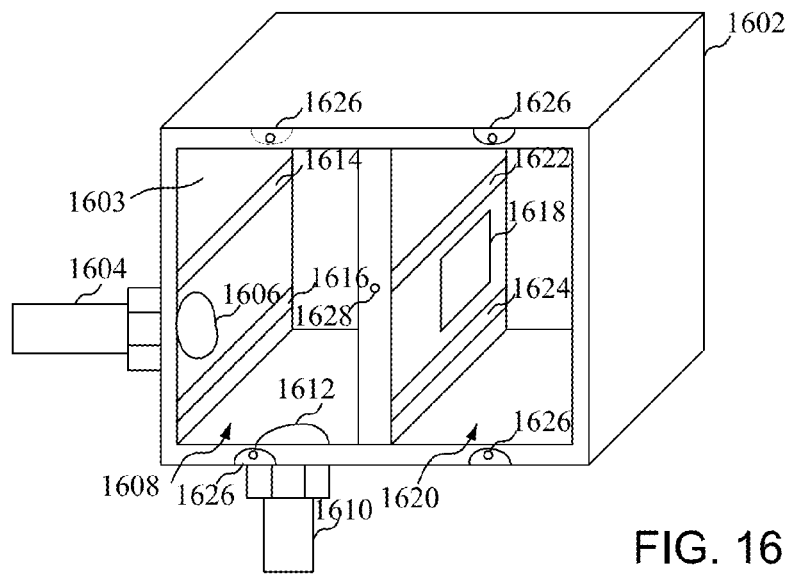
FIG. 16 is an electrical box adapted to receive an in-wall light timer and a wireless transceiver according to an embodiment of the present invention.

Turning now to FIG. 16, an electrical box adapted to receive an in-wall light timer and a wireless transceiver according to an embodiment the present invention is shown. The electrical box 1602 preferably comprises a receptacle 1603 for receiving both a timer in one bay and a wireless data transceiver in another bay. More particularly, a first portion of conduit 1604 is coupled by a through-hole 1606 to a first bay 1608, where the through-hole enables power and ground wires, and the wires associated with a light to be accessible by the timer. The electrical box 1602 is accessible from a second portion of conduit 1610 by a through hole 1612. Rails 1614 and 1616, along with corresponding rails on the opposite side of the first bay 1608, enable the attachment of the timer to the receptacle 1603. A window 1618 enables the connection of contact elements 810-814 of the timer 202 and contact elements 1412-1420 of the wires data transceiver 1202. That is, when the wireless data transceiver is positioned in the second bay 1620 on rails 1622 and 1624 (and corresponding rails on the opposite side of the second bay), the contract elements of the timer and the wireless data transceiver will be aligned and in electrical contact through the window. The upper and lower attachment elements on each of the timer and wireless data transceiver preferably extend far enough out from the sides of the timer to leave room for the wires. That is, after the wires are attached to the timer and the timer is inserted into the first bay 1608, the wires will fit between the wall of the insert having the rails 1614 and 1616 and the side of the timer or below the timer. Finally, the box comprises elements 1626 for receiving screws to secure the timer and wireless data transceiver to the box, and the receptacle 1603 comprises an element 1628 for receiving a screw to secure a cover over the front of the electrical box.

Figure 17:
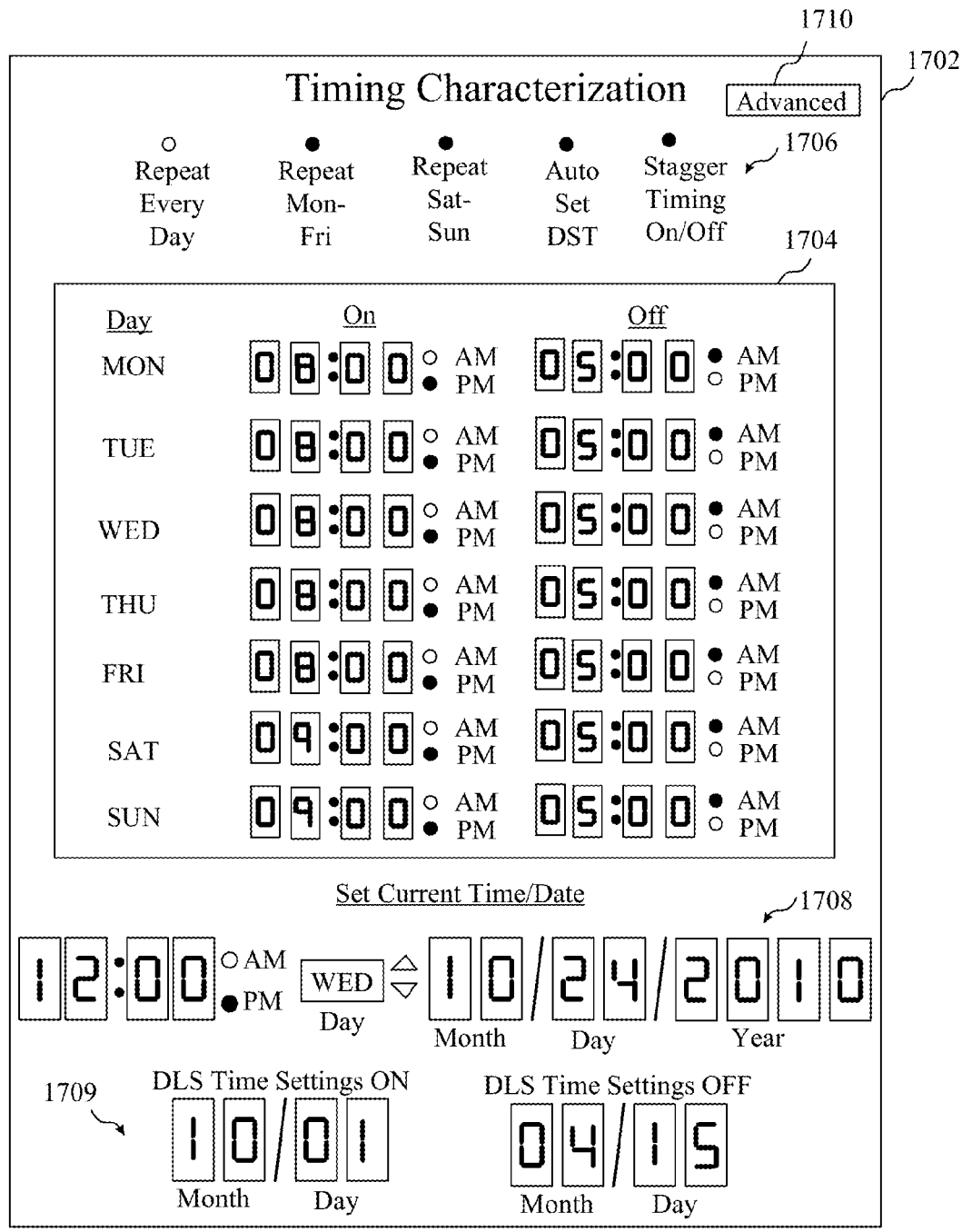
FIG. 17 is a program screen enabling the entry of timing characterization data by a computer for implementing a light timer according to an embodiment of the present invention.

Turning now to FIG. 17, a program screen enabling the entry of timing characterization data by a computer for implementing a light timer is shown. The program screen of FIGS. 17-22 are provided on a display of the computer 130 in response to operating a computer program stored on a memory of the computer (or other computer-readable storage medium such as a CR-ROM). Data entered on the various program screens of the computer program are stored on the portable memory device which may then be used by the timer as described above. By way of example, a USB portable memory device may be inserted in a USB port of the computer 130 to enable entering the timing characterization data, and then removed and inserted into the timer as described above to load the timing characterization data into the timer. According to one embodiment, the program for storing the timing characterization data may be stored on the portable memory device, and when the data file on the portable memory device is opened, the program for storing the timing characterization data will be automatically opened. Accordingly, a portable memory device provided with the timer when it is purchased could provide all of the necessary elements to configure and operate the timer. Because the portable memory device could be used to configure multiple timers, a plurality of timers could be provided in a package with the portable memory device for purchase by an end user.

The timing characterization data may comprise varying amounts of data, but comprises at least one on/off setting for a timer. As will be described in more detail below, the timing characterization data may comprises a plurality of sets of data, including different sets for standard time and daylight savings time. According to some embodiments, the timing characterization data may include a current time and date entered by a user on the computer program. As will be described in more detail below, the current date entered by the user may be used to determine whether to apply a certain set of timing characterization data, such as a set of data for daylight savings time. Because a memory of the timer may comprise a memory having calendar information, such as future dates for daylight savings time, the current date would be used by a control circuit to determine which set of timing data would be used.

According to the embodiment of FIG. 17, a program screen 1702 comprises a main screen which enables the entry of the minimal amount of information necessary to operate the timer. An on/off field 1704 comprises an on time and an off time for each day of the week, where each on time and off time has an AM and PM setting. The numbers may be entered by highlighting the current number for a given time, and entering the desired number on the keypad of the computer, for example.

A customization field 1706 enables customization of the entry program. The customization field will not only ease entry of data in the program screen 1702, but also provide a more desirable performance of the timer. For example, a user may be able to select an option to repeat an entry for every day of the week. If the user selects that option before entering data, the on and off times for Tuesday through Sunday will automatically be entered to match the times entered for Monday. A user could also select an option for repeating Monday-Friday and/or repeating Saturday and Sunday. A user may select an option to enable automatically setting a daylight savings time feature. As will be described in more detail below, the daylight saving time feature could change the time to daylight savings time automatically (based upon a calendar stored in a memory of the timer), and may implement the timer according to daylight saving time characterization data if available. According to a further embodiment, a user may select a staggered on/off timing feature. The staggered on/off timing feature will stagger the times that the light is turned on and off relative to the stored time. The on and off times may be staggered by a varying number of minutes from 1 minute to 15 minutes, for example, and would preferably be performed randomly.

As shown in the embodiment of FIGS. 2 and 3, no actuators are provided for entering the current time or date. Accordingly, the current time and date must be entered in a field 1708 on the profile screen 1702. The user would preferably set the current time just before the timing characterization data is saved, so that the user could then just insert the portable memory device into the timer to store the timing characterization data. According to one embodiment of the invention, the computer program would prompt a user to enter the current time and date after the user attempts to finalize the data.

The user could use the current time and data field 1708 with a timer having actuators for entering a time and date, such as the embodiments of FIGS. 4-6. In that case, the user could also enter the time and date on the timer in those embodiments, where the timer would ignore data fields having all zeros entered for the value. If the user enters data in the data field 1708, the timer would use that data even if the timer had date and time actuators, but would change the date and time data in response to a later selection of date and time actuators on the timer after data is input to the timer based upon data entered in the data field 1708.

The profile screen 1702 could further include an optional field 1709 enabling a user to manually set dates for applying a certain set of timing characterization data, such as daylight savings timing characterization data. That is, the user could enter a first date indicating the date upon which the daylight savings time timing characterization data should be applied and a second data indicating when daylight savings time should end and the standard time timing characterization data should be applied. By selecting the "Auto Set DST" selection in customization field 1706, daylight savings time timing characterization data will automatically be selected by a control circuit of the timer between the on and off dates entered in the field 1709. Accordingly, if the dates are entered in the field 1709, a daylight savings time actuator would not be necessary on a user interface of the timer. While the dates for applying a set of timing characterization data is shown by way of example for daylight savings time data, dates could be applied for other sets and more than two sets of data. Finally, if the user would like to set additional features of the timer, the user would select the advanced actuator 1710.

Figure 18:
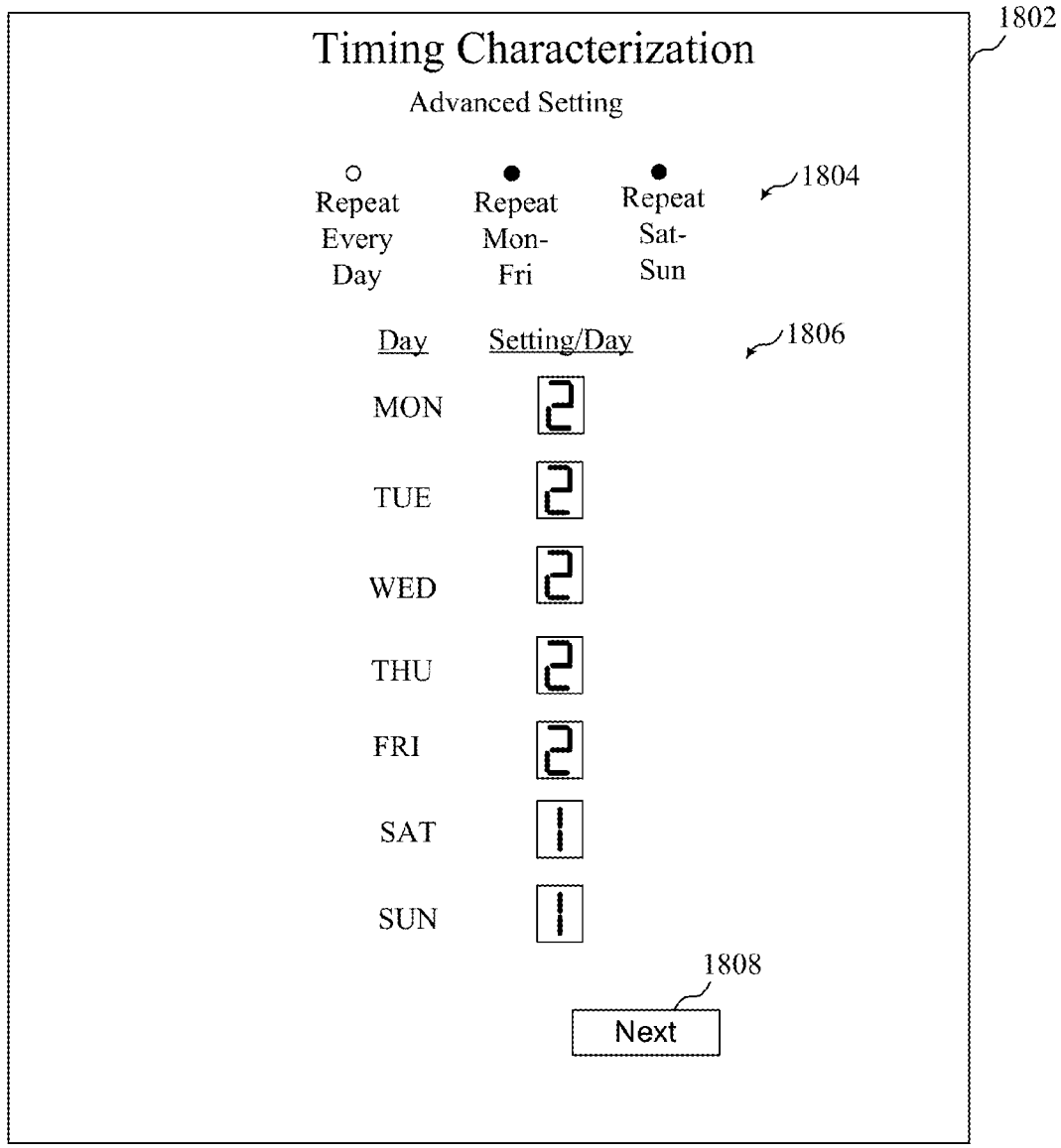
FIG. 18 is a program screen enabling the entry of advanced settings of timing characterization data by a computer for implementing a light timer according to an embodiment of the present invention.

Turning now to FIG. 18, a program screen enabling the entry of advanced settings of timing characterization data by a computer for implementing a light timer is shown. One beneficial feature of a timer is to allow multiple on/off settings for a given day. In particular, a program screen 1802 allows a user to select whether the same number of settings will be provided for each day of the week, Monday-Friday, or Saturday and Sunday in a field 1804. The user would then enter the appropriate data in a field 1806. As in the program field 1702, selecting one of the options in field 1804 would enable a user to reduce the number of settings that would need to be entered. A user would then select a next field 1808.

Figure 19:
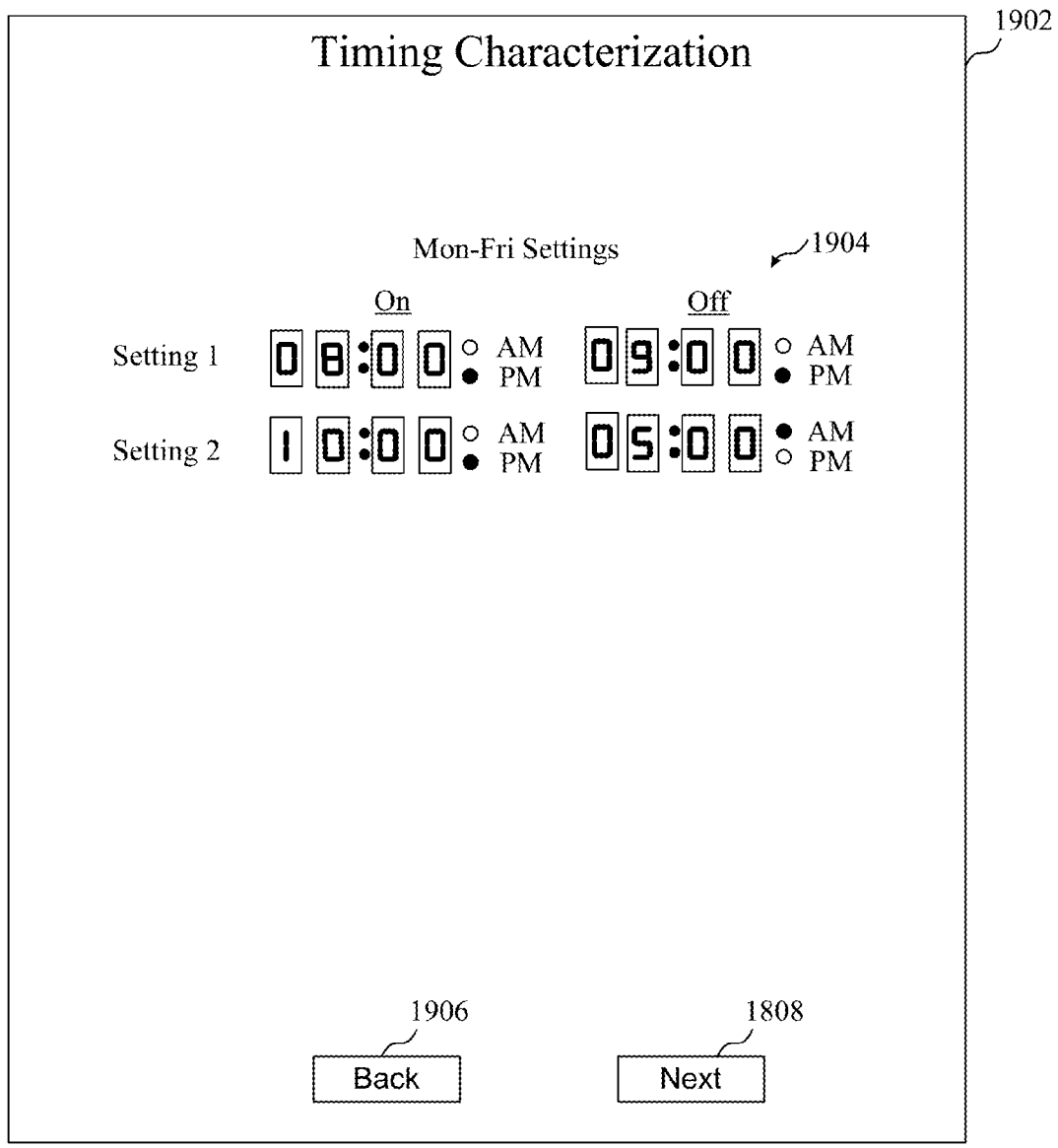
FIG. 19 is a program screen enabling the entry of timing characterization data for a plurality of on/off periods for implementing a light timer according to an embodiment of the present invention.
Figure 20:
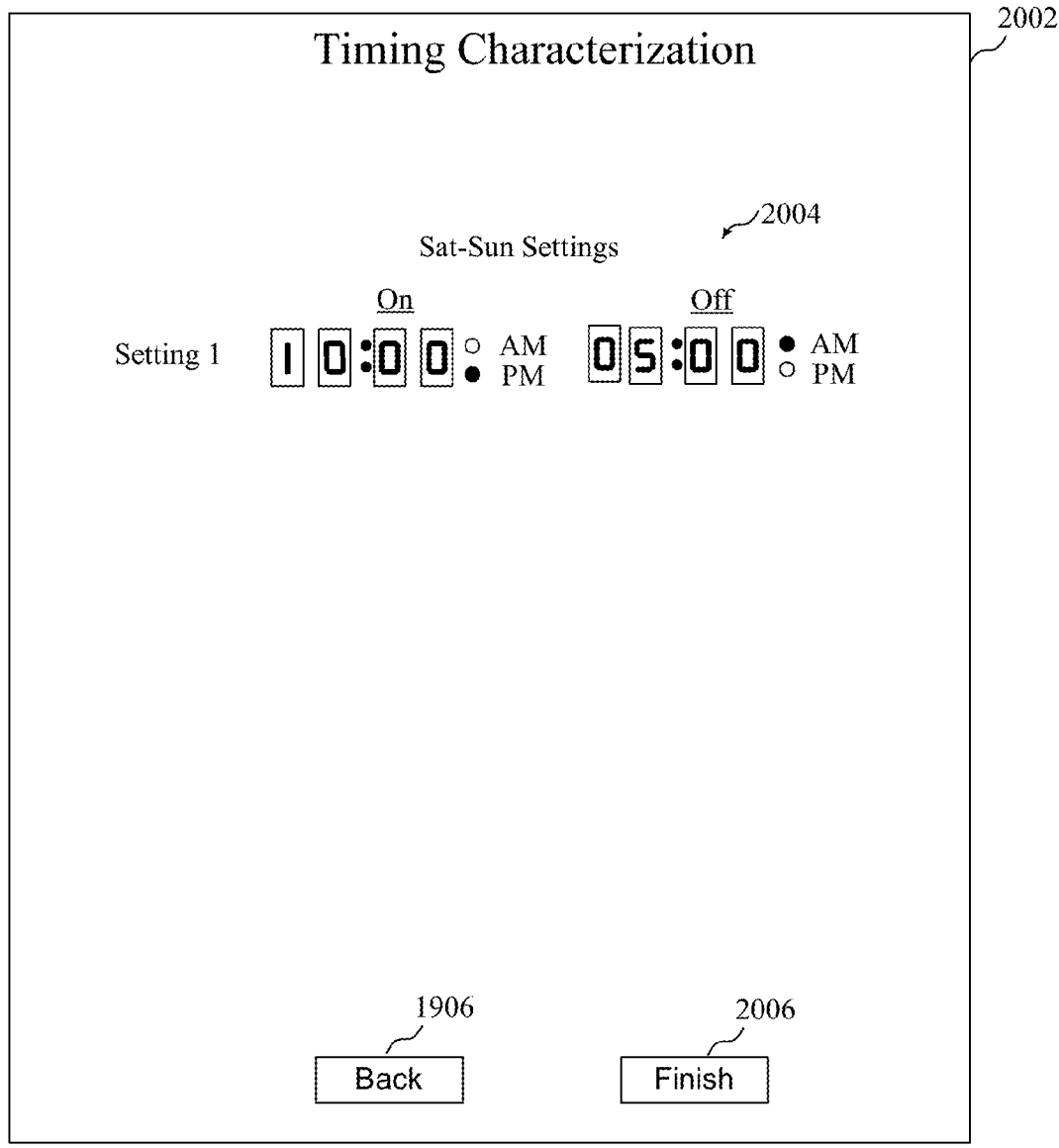
FIG. 20 is a program screen enabling the entry of timing characterization data for a single on/off period for implementing a light timer according to an embodiment of the present invention.

As shown in FIG. 19, a program screen 1902 enables the entry of timing characterization data for a plurality of on/off periods for implementing a light timer during Monday-Friday in a field 1904. Because 2 settings were entered in the program screen 1808 for Monday-Friday, two settings are provided in the program screen 1902. A user may also go back to a previous screen by selecting the back actuator 1906. Only a single entry is then shown in the program screen 2002, as shown in FIG. 20. After selecting a finish actuator 2006, the user may then use the portable memory device in the timer. As set forth above, the user may be prompted to enter or verify the correct time before finally saving all of the data.

According to another feature of the invention, a user can set data for daylight savings time when setting other characterization data. When daylight saving times data is entered, the daylight savings data will be used during established periods for daylight savings time. For example, according to the embodiment of FIG. 5 for example, the daylight savings time data would be applied when a daylight saving time actuator is moved to the on position, indicating that the daylight savings time data should be applied. If dates for applying daylight savings time timing characterization data were entered or calendar dates associated with daylight savings times stored in a memory of the timer, daylight savings time data could only be used during those periods. That is, even if the actuator is set to daylight savings time, the timer would only utilize daylight savings time characterization data when the current date is within an established daylight savings period, as established by on/off dates of daylight savings times or calendar information stored in a memory of the timer. If no daylight savings time actuator is provided on the timer, the timer may automatically apply daylight savings time data whenever the automatic daylight savings time option is selected, such as on the program screen 1702 and the current time is within the established period for daylight savings time.

As shown in FIG. 21, a program screen enables the entry of timing characterization data by a computer for an automatic daylight savings feature. A first field 2104 is provided for standard time timing characterization data, while a second field 2106 is provided for daylight savings time timing characterization data. The various settings for standard time and daylight savings time of fields 2104 and 2106 could also include advance features for each set of timing characterization data as described above in reference to FIGS. 18-20.

As shown in FIGS. 22A and 22B, program screens enable the entry multiple settings of timing characterization data when implementing a light timer according to an embodiment of the present invention. Similar to the embodiment of FIG. 21, the embodiment of FIG. 22 enables multiple settings, but the settings may be for different timers. For example, an A setting may be for a timer that is used for the front of the house, a B setting may be used for a timer that is used for the back of the house, a C setting may be used for a timer for an indoor light on a first floor, and a D setting may be used for a timer for an indoor light on a second floor. However, it should be noted that the user cold set the A-D settings for any category of timing characterization, such as a vacation setting, a school year setting, a summer setting, etc. By storing multiple settings of timing characterization data, a single portable memory device could be used to load timing characterization data for multiple timers. Further, providing multiple settings on the portable memory device enables a flexible use of a given timer without having to reload timing characterization data. That is, one of the four settings designated as settings A-D could be selected by an actuator, such as actuator 602 of FIG. 6, for example. As in the embodiment of FIG. 21, the various settings could also include advanced features, including features enabling daylight savings time settings for each set of characterization data as described above in reference to FIGS. 18-20.

According to one embodiment of the invention, the portable memory device comprises a proprietary memory device. While any memory device may be used, a proprietary memory device may prevent the timer from accessing incorrect data. According to one embodiment, the proprietary memory device comprises a single file which may only be opened on a computer by a program provided by the manufacturer of the timer for storing the data (or by the control circuit of the timer for implementing the data). The name of the data file could not be changed, and only data associated with fields accessible by the user could be entered or changed by the user. Further, the portable memory device may also contain the computer program necessary to enter the timing characterization data. Accordingly, by "double-clicking" on the timing characterization data file, the computer program necessary to enter the timing characterization data will automatically open the timing characterization data file, enabling a user to set or change desired timing characterization data.

Turning now to FIGS. 23-27, methods of implementing a timer are shown. The methods of FIGS. 23-27 may be implemented using any of the timers or the program screens of the computer program as described, for example. Although various steps of the methods are described, it should be understood that additional steps could be implemented according to other features and functionality of the timers and program screens as described. It should further understood that the various methods, although shown in different methods, may be employed together.

Figure 23:
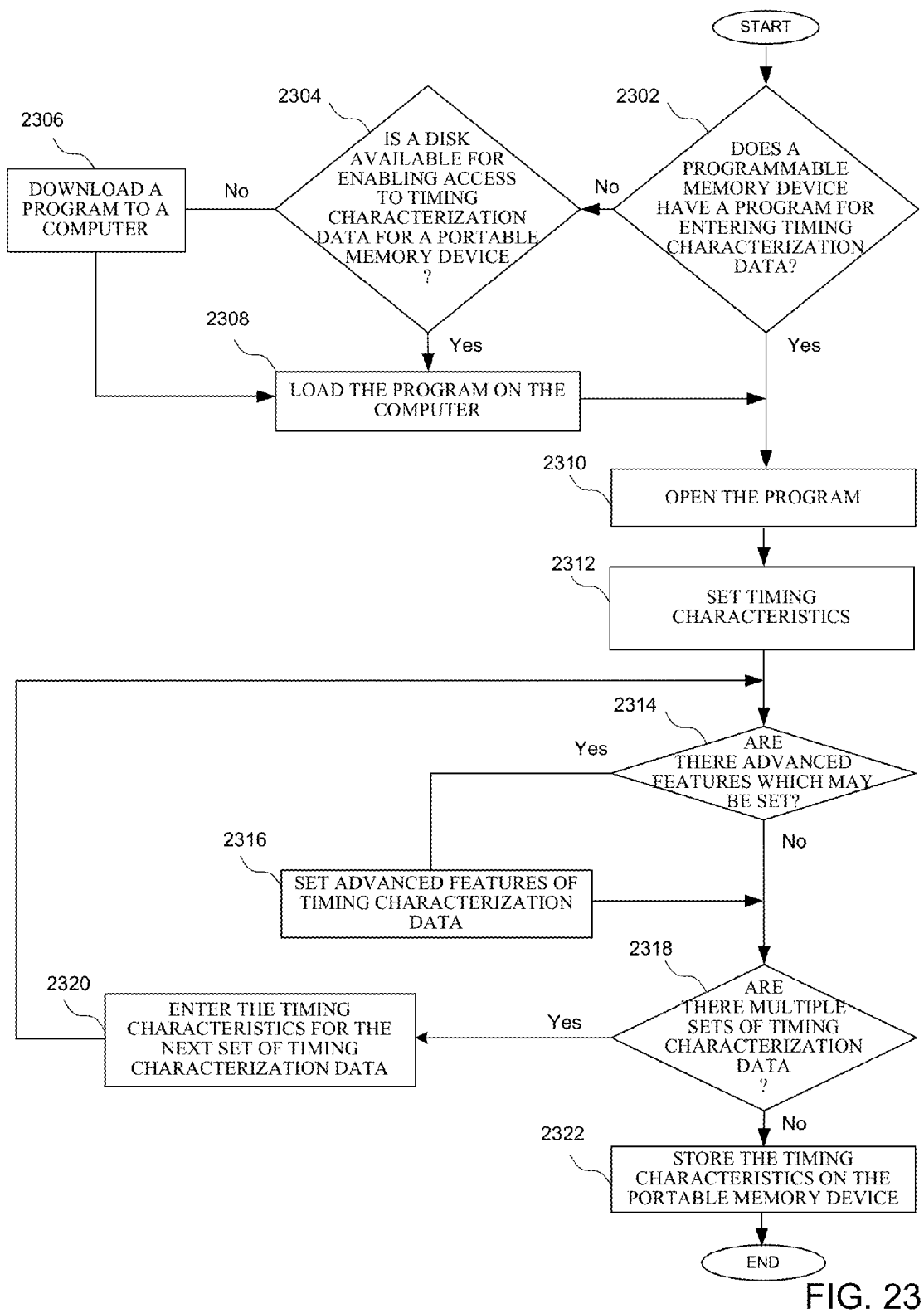
FIG. 23 is a flow chart showing a method of generating timing characterization data according to an embodiment of the present invention.

According to the method of FIG. 23, a flow chart shows a method of generating timing characterization data according to an embodiment of the present invention. It is first determined whether a portable memory device has a program for entering timing characterization data at a step 2302. If not, it is then determined whether a disk is available for enabling access to timing characterization for a portable memory device at a step 2304. If not, a program is downloaded to a computer, such as through an internet connection by way of the communication network at a step 2306. The program is loaded on the computer at a step 2308, and is opened at a step 2310. Timing characterization data are set at a step 2312. It is then determined whether there are advanced features which may be set at a step 2312. If so, advanced features of the timing characterization data are set at a step 2316. It is then determined whether multiple settings are required at a step 2318. If so, the timing characterization data for the next settings are set at a step 2320. If not, the timing characterization data are stored at a step 2322.

Figure 24:
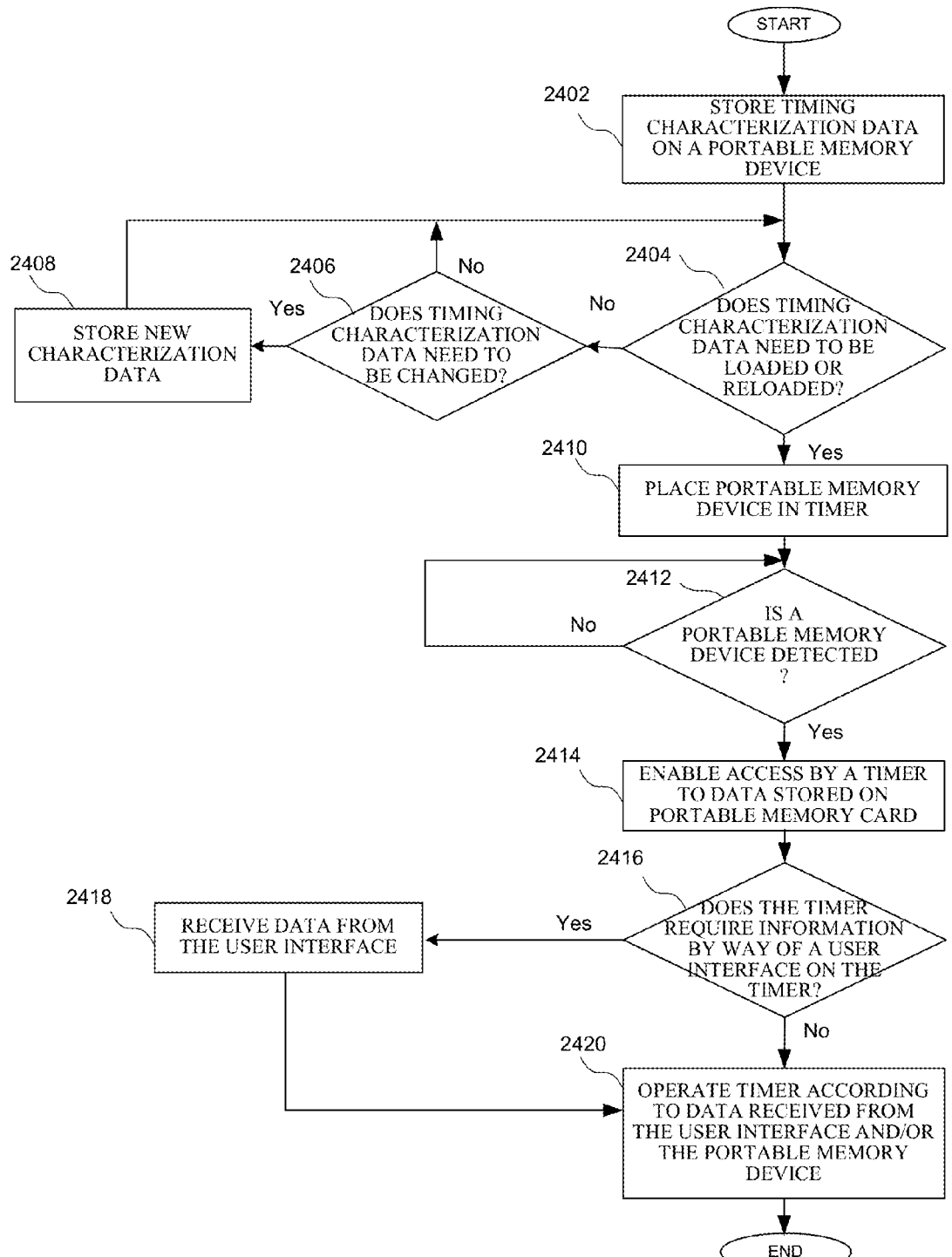
FIG. 24 is a flow chart showing a method of loading timing characterization data according to an embodiment of the present invention.

Turning now to FIG. 24, a flow chart showing a method of loading timing characterization data according to an embodiment of the present invention is shown. Timing characterization data is stores on a portable memory device at a step 2402. It is then determined whether the timing characterization data needs to be loaded or reloaded at a step 2404. It is also determined whether the timing characterization data needs to be changed at a step 2406. If so, new data associated with timing characterization data is stored at a step 2408. A portable memory device is placed in timer at a step 2410. It is then determined whether a portable memory device is detected at a step 2412. Access by a timer to data stored on portable memory device is enabled at a step 2414. It is then determined whether the timer requires information by way of a user interface on the timer at a step 2416. If so, data is received from the user interface at a step 2418. The timer is then operated according to new data at a step 2420.

Figure 25:
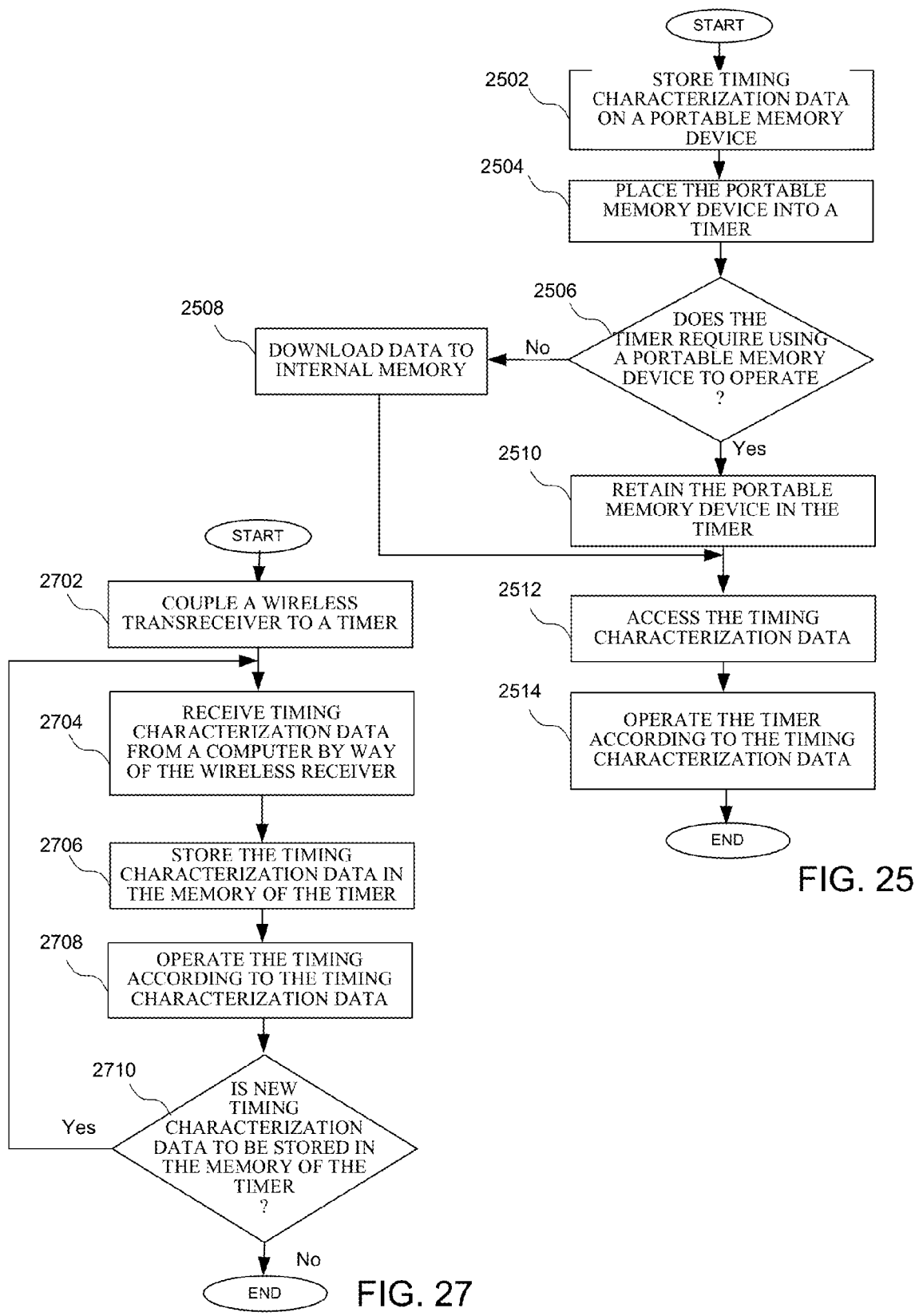
FIG. 25 is a flow chart showing a method of accessing timing characterization data from a plurality of sources according to an embodiment of the present invention.

Turning now to FIG. 25, a flow chart shows a method of accessing timing characterization data from a plurality of sources according to an embodiment of the present invention. Timing characterization data is stored on a portable memory device at a step 2502. A portable memory device is then placed into a timer at a step 2504. It is then determined whether a timer requires using the portable memory to operate at a step 2506. If not, the timing characterization data is downloaded to an internal memory at a step 2508. Otherwise, a portable memory device is retained in timer at a step 2510. The timing characterization data is accessed at a step 2512. The timer is operated according to the timing characterization data at a step 2514.

Figure 26:
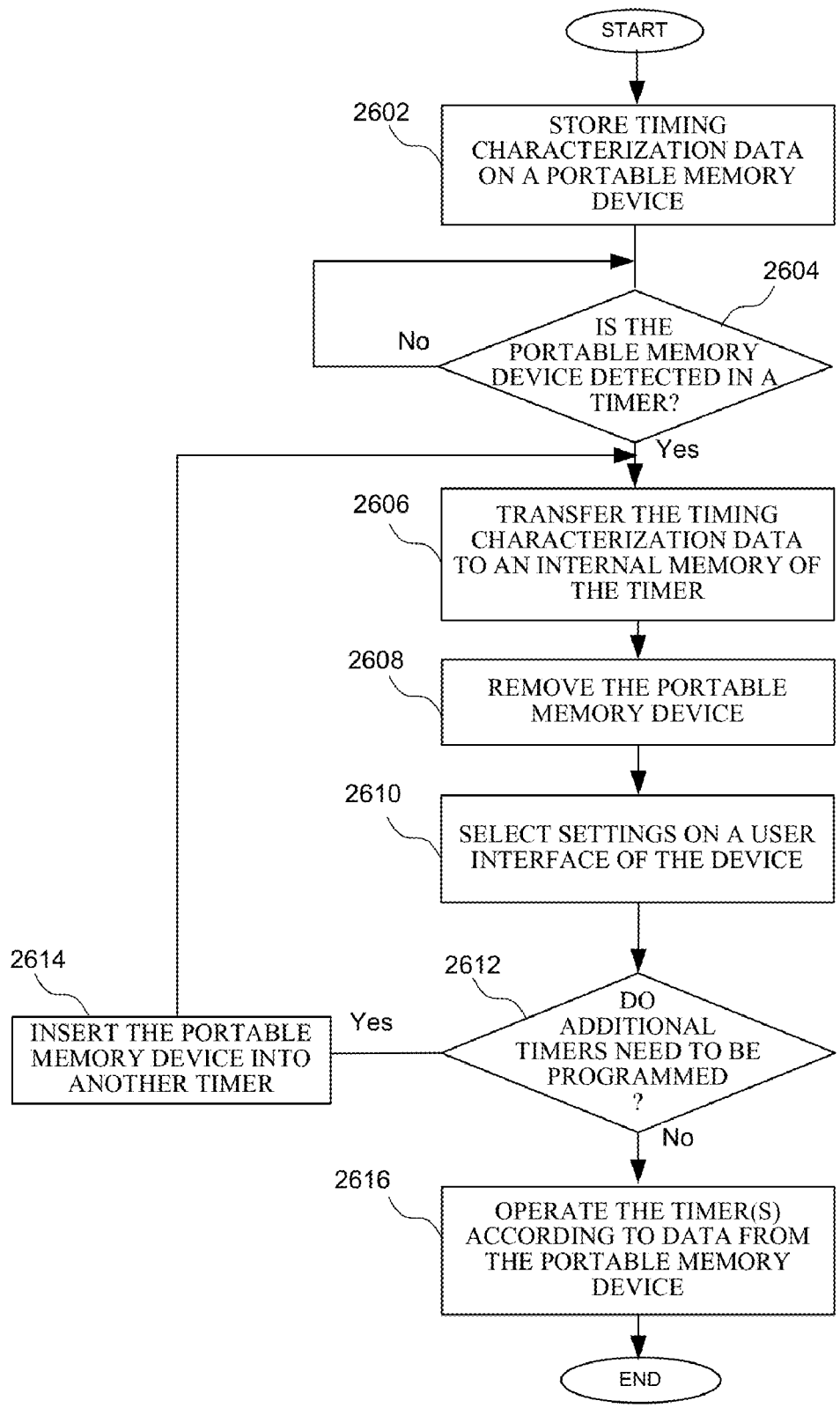
FIG. 26 is a flow chart showing a method of configuring multiple timers according to an embodiment of the present invention.

Turning now to FIG. 26, a flow chart shows a method of configuring multiple timers according to an embodiment the present invention. Timing characterization data is stored on a portable memory device at a step 2602. It is then determined whether the portable memory device is detected in the timer at a step 2604. Timing characterization data is transferred to an internal memory of the timer at a step 2606. The portable memory device is removed at a step 2608. Settings are selected on a user interface of the device as necessary at a step 2610. It is then determined whether additional timers need to be configured at a step 2612. If so, the portable memory device is inserted into another timer at a step 2614. The timer or timers are then operated according to data from the portable memory device at a step 2616.

Turning now to FIG. 27, a flow chart shows a method of implementing a timer using a wireless transceiver according to an embodiment of the present invention. A wireless receiver is coupled to a timer at a step 2702. Timing characterization data is received from a computer by way of the wireless receiver at a step 2704. The timing characterization data is stored in a memory of the timer at a step 2706. The timer is operated according to the timing characterization data at a step 2708. It is then determined whether new timing characterization data is to be stored in the memory of the timer at a step 2710.

Accordingly, the timer and methods of the present invention may provide an interface to set the time and day for the timer, and receives all other information from a portable memory device. More particularly, the timer has a simple interface for setting the current time and day of the week, such as one button to change the hour, one button to change the minute and one button to change the day of the week, where each of the hour, minute and day is shown on the display. The timer comprises a slot for receiving a portable memory device, such as a memory device including but not limited to an SD card, Sony memory stick, or portable USB memory device.

A system employing the timer comprises a software tool enabling a user to program the portable memory device in a slot of the computer. When the user opens a file for the timer, the software tool enables the user to view and change the settings (i.e. on/off times for each day) of the profile. When changes are made and accepted by the user, the user can then replace the portable memory device in the timer which will implement a timing function based upon the settings of the file stored in the portable memory device. The software tool for viewing and changing the settings may be provided to the user with the timer at the time of purchase, or downloaded by the user from a website associated with the manufacturer of the timer.

The interface on timer may provide a portion of the input with the remaining input coming from the portable memory device. The portable memory device may remain in the timer or may be used to provide data to be stored in a memory on the timer. The interface on the timer may update data stored in its memory upon detection of receiving the portable memory device or when the user selects a "configure" button after inserting the portable memory device. The content of the portable memory device may be used with multiple timers. Multiple profiles may be stored on the portable memory device and used by the timer, either directly from the portable memory device or after being downloaded to the timer.

The user interface of the timer is adapted to select different modes. The user interface of the timer is adapted to select between a standard time mode and a daylight savings mode, where the timer not only automatically changes the time to the correct time, but also accesses a different profile. The user interface may also have a selection option for selecting between multiple profiles (e.g. profiles A-D). The user would create the profiles A-D, and select a given profile for each timer using a selector on the user interface of the timer. The user could easily change the "A-D" setting to change the operation of timer without having to reconfigure it. For example, the user may want have an A setting for indoor lights downstairs, a B setting for indoor lights upstairs, and a C setting for outdoor lights in the front of the house and a D setting for outdoor lights in the back of the house. The user may set all of the outdoor lights to the C setting, but when on vacation, may want to keep the lights in the back of the house on longer, and set it to the D setting.

The user interface of the software tool implemented on a separate computer is arranged to enable a range of operation from a very simple configuration of "on/off" settings for each day of the week, to a more complex configuration which allows multiple settings for each day and other variations in the time that a light would be turned on. The timer may allow for staggering of times to avoid the appearance that a timer is used. For example, if a timer is set to be on from 7:00 PM to 11:00 PM each night, it may go on anywhere from 6:30 to 11:30, where the on/off times are not only staggered between nights in a week, but also for a given night (e.g. Tuesday) over a number of weeks. In any case, the user interface is simple to enable entering the times for each day, for each profile (e.g. A-D), etc., and other features are easy to select and customize.

On benefit of the timer and methods of the present invention is that they significantly reduce the environmental impact of the use of lights in building structures. By using the timers and implementing the methods of the present invention, the amount of time that lights may be on in a building may be significantly reduced, thereby reducing the amount of energy necessary to use the lights. That is, because the timers are simple and convenient to use, a greater number of people would use the timers, and more particularly the most efficient use of energy necessary to provide lighting in a building. Even people who may not otherwise wish to use a timer or adjust a timer that is not providing the right timing settings may be willing to use a timer. Because lighting for buildings requires such a significant amount of power, the aggregate reduction in power across the world would significantly reduce the amount of energy required to light buildings, and therefore reduce the environmental impact resulting from the production of power to light the buildings.

It can therefore be appreciated that the new and novel timer and method of implementing a timer has been described. It will be appreciated by those skilled in the art that numerous alternatives and equivalents will be seen to exist which incorporate the disclosed invention. As a result, the invention is not to be limited by the foregoing embodiments, but only by the following claims.

I claim:

1. A circuit for implementing a configurable light timer controlling a light, the circuit comprising:
   an input portion for receiving timing characterization data, the input portion having a slot adapted to receive a portable memory device storing the timing characterization data;
   a control circuit coupled to access a set of data of a plurality of sets of data of the timing characterization data;
   a multiple setting selection actuator coupled to the control circuit, the multiple setting selection actuator enabling a selection of the set of data to be implemented by the control circuit; and
   a daylight savings time actuator coupled to the control circuit for enabling the control circuit to implement a set of data associated with daylight savings time.

2. The circuit of claim 1 wherein each set of data of the plurality of sets of data comprises standard time data and a daylight savings time data.

3. The circuit of claim 2 wherein the daylight savings time actuator will enable the manual selection of the daylight savings time data.

4. The circuit of claim 3 wherein the daylight savings time actuator will enable the control circuit to select the daylight savings time data during a daylight savings time period based upon a current date stored in the configurable light timer.

5. The circuit of claim 1 further comprising day and time actuators on the configurable light timer for entering a current day and time.

6. The circuit of claim 5 wherein the control circuit implements the configurable light timer based upon the set of data associated with daylight savings time and the current day and current time entered using the day and timer actuators on the configurable light timer.

7. A circuit for implementing a configurable light timer controlling a light, the circuit comprising:
   an input portion for receiving timing characterization data having daylight savings time data and standard time data;

a control circuit for accessing a set of data of the timing characterization data; and a daylight savings time actuator coupled to the control circuit, the daylight savings time actuator enabling the selection of a set of daylight savings time data to be accessed by the control circuit.

8. The circuit of claim 7 wherein the input portion comprises a slot adapted to receive a portable memory device having the timing characterization data.

9. The circuit of claim 7 further comprising a memory storing calendar data including dates of a daylight savings time period.

10. The circuit of claim 9 wherein the daylight savings time actuator selects a set of data based upon a current date.

11. The circuit of claim 10 wherein the configurable light timer stores a plurality of sets of data wherein each set of data of the plurality of sets of data comprises standard time data and daylight savings time data.

12. The circuit of claim 7 further comprising a multiple setting selection actuator coupled to the control circuit, wherein the multiple setting selection actuator enables the selection of one of a plurality sets of data and the daylight savings time actuator enables the selection of daylight savings time data associated with the one of the plurality of sets of data.

13. The circuit of claim 7 further comprising a review actuator for reviewing a selected set of timing characterization data.

14. A method of implementing a configurable light timer controlling a light, the method comprising:

receiving timing characterization data having a plurality of sets of data;

receiving an input from a multiple setting selection actuator on the configurable light timer;

selecting a set of data in response to the input from the multiple setting selection actuator; and implementing, by the configurable light timer, the set of data;

wherein receiving timing characterization data having a plurality of sets of data comprises receiving a set of standard time data and a set of daylight savings time data.

15. The method of claim 14 wherein receiving timing characterization data having a plurality of sets of data comprises receiving, for each set of data of the plurality of sets of data, a set of standard time data and a set of daylight savings time data.

16. The method of claim 14 further comprising implementing the set of daylight savings time data in response to a selection using a daylight savings time actuator.

17. The method of claim 14 further comprising implementing the set of daylight savings time data in response to a current date setting.

18. The method of claim 14 further comprising receiving current day and time data from day and time actuators on the configurable light timer.

* * * * *